United States Patent Office 3,160,670
Patented Dec. 8, 1964

3,160,670
ALKYLATION PROCESS EMPLOYING A KC$_8$ CATALYST
Walter E. Foster, Baton Rouge, La., assignor to Ethyl Corporation, New York, N.Y., a corporation of Virginia
No Drawing. Filed Dec. 19, 1960, Ser. No. 76,449
8 Claims. (Cl. 260—671)

This invention relates to alkylation processes and more particularly to the alkylation of aromatic hydrocarbons.

Alkylation of aromatic hydrocarbons has been carried out in the past chiefly with catalysts of the Friedel-Crafts type such as sulfuric acid, hydrogen fluoride, aluminum chloride, zinc chloride, and the like. This method causes alkylation to take place preferentially on an aromatic nucleus. This method suffers from the disadvantage that the reaction is very difficult to keep under control. More recently a method of alkylating certain hydrocarbons using sodium as a catalyst has been disclosed. In this case alkylation takes place on the side chain of an alkyl aromatic hydrocarbon. The prior art teaches that only aromatic hydrocarbons having at least two hydrogens on a carbon which is directly attached by a single bond to the aromatic nucleus can be so alkylated. The prior art has made no provision for a flexible process for alkylation of a nuclear carbon atom in an aromatic hydrocarbon and for alkylation of the alpha carbon atom of an alkyl-substituted aromatic hydrocarbon. A process has now been discovered which can give carefully controlled direct alkylation of a nuclear carbon atom of an appropriate aromatic hydrocarbon. On the other hand, when this process is applied to aromatic hydrocarbons having a substituent possessing an alpha carbon atom carrying at least one hydrogen atom, the alkylation is directed to that carbon atom.

An object of this invention is to provide a new flexible process for carrying out alkylation reactions. A further object is to provide a new method for alkylating a nuclear carbon atom of an aromatic hydrocarbon. Still another object is to provide a new method for alkylating aromatic hydrocarbon compounds containing a carbon having attached thereto at least one hydrogen atom, said carbon atom being singly bonded to a nuclear carbon atom which in turn is doubly bonded to a second nuclear carbon atom with alkylation taking place at the alpha carbon atom.

Accordingly, the above and other objects of this invention are accomplished by the provision in a process of alkylating an aromatic hydrocarbon with an acyclic monoolefin having not more than 12 carbon atoms, of the improvement which comprises conducting said reaction in the presence of an alkali metal graphite inclusion compound. The alkali metal of the alkali metal graphite inclusion compound can be potassium, rubidium or cesium. These inclusion compounds are generally believed in the art to include such compounds as KC$_8$, KC$_{16}$, RbC$_8$, and CsC$_8$, and any of these forms of the compounds can be used in effecting the present process. The present process employs temperatures from about 25° C. to about 300° C. and pressures from about 1 atmosphere to about 1000 atmospheres sufficient to effect the alkylation reaction. A preferred embodiment of this invention is the application of the above process to the alkylation of an aromatic hydrocarbon containing a saturated hydrogen-containing carbon atom adjacent to an unsaturated nuclear carbon atom with an acyclic monoolefin with not more than 12 carbon atoms. In this instance very good yields of aromatic hydrocarbons alkylated on the carbon atom adjacent the nucleus result.

In practicing the present invention, some of the aromatic hydrocarbons, which are alkylated on the nuclear carbon atom, are benzene, naphthalene, anthracene, phenanthrene, tert-butyl benzene, and the like. These aromatic hydrocarbons are rapidly and smoothly alkylated with the formation of products where the alkyl group introduced into the nucleus is derived from the alkylating agent. Control of the extent and type of alkylation and the products obtained is achieved by variation in the reaction conditions, e.g., time, temperature and pressure and in some instances the proportions of the reactants. For example, benzene was effectively converted upon reaction with ethylene to sec-butyl benzene under conditions described below.

Other materials which may be alkylated comprise aromatic hydrocarbons having a saturated carbon atom containing at least one hydrogen atom wherein the saturated carbon atom is bonded to an aromatic nucleus. In this preferred embodiment, aromatic compounds such as toluene, diphenyl methane, and n-butyl benzene are alkylated on the alpha carbon atom. Nuclear alkylation is normally insignificant. Other examples of aromatic hydrocarbons which can be alkylated by this process are o-, m- and p-xylenes, trimethyl benzenes, ethyl benzenes, diethyl benzenes, 9,10-dihydrophenanthrene, and the like.

As the alkylating agent any non-conjugated olefin is satisfactory. Preferably, use is made of acyclic monoolefins of 12 or less carbon atoms. Examples of such preferred alkylating agents are ethylene, propylene, butene-1, butene-2, pentene-1, pentene-2, hexene-1, hexene-2, hexene-3, the various acyclic heptenes, octenes, nonenes, decenes, undecenes, dodecenes, isobutylene, 3-methyl butene-1, 4-methyl pentene-1, 3-methyl heptene-1, 2-ethyl butene-1, 3-methyl hexene-3, and the like. Especially preferred olefins in this invention are ethylene and isobutylene because of the facility with which they react and because of their low cost and abundance.

Thus, in carrying out this invention one reacts, for example, benzene with ethylene in the presence of potassium graphite inclusion compound to obtain secondary butyl benzene as well as other valuable by-products, i.e., biphenyl. Similarly, when toluene is reacted with ethylene in the presence of the potassium graphite inclusion compound the products obtained are 3-phenyl pentane and n-propyl benzene. Thus, it can readily be seen that by small variations of the processes one may obtain varied products of considerable value in the chemical arts. The pattern of alkylation of aromatic hydrocarbons with other olefins is similar to that illustrated in these examples.

The employment of alkali metal graphite inclusion compounds form a unique portion of this invention. As pointed out above, the alkali metal used may be either potassium, rubidium or cesium, or mixtures of two or more of these. The preferred alkali metal for use in the inclusion compound is potassium because of its excellence from a cost-effectiveness standpoint. The mechanism of this reaction and the part played by the alkali metal graphite inclusion compound is not fully known although not desiring to be bound by any theoretical considerations, it is believed that this is not a catalytic reaction in the usual sense of the term. It is felt that the alkali metal graphite inclusion compound causes certain exchange reactions or hydrogen shifts which lead to a more stable carbanion which is a weaker base thus causing the desired reaction and giving the desired alkylated aromatic hydrocarbon.

Since oxygen reacts destructively with the inclusion compound causing it to turn from copper orange to black, it is preferable that the alkylation reaction be carried out in substantially oxygen-free surroundings. Therefore, effective use can be made of inert atmospheres such as nitrogen, argon, krypton, or the like. However, these inclusion compounds are effective oxygen scavengers and can be employed in the presence of greater quantities of oxygen if they are present in amount in excess of the quantity consumed by oxygen.

The amount of the inclusion compound to be employed is dependent to some extent upon the pressure of the operation. At higher pressures somewhat smaller amounts can be used than are preferable at lower pressures. Generally the amount of the catalyst used should be from about 0.01 percent to about 30 percent by weight of the amount of aromatic hydrocarbons used with best results obtained when the amount of alkali metal inclusion compound is between 0.1 and 5 percent by weight of the amount of aromatic hydrocarbon used.

The present reaction is operable at temperatures ranging from about 25° C. to about 300° C. For best results, it is preferred to operate at temperatures in the range of from about 100° C. to about 250° C.

This invention is operable over a pressure range varying from 1 atmosphere to 1000 atmospheres. The preferred pressure range is from below about 100 atmospheres.

Another particularly unique feature of this invention is the flexibility of the process. By controlling and varying the reaction conditions one may obtain different end products. For example, when benzene is reacted with ethylene at 540 p.s.i.g., 112° C., and 3 hours, sec-butyl benzene is obtained whereas at 900 p.s.i.g., 200° C., and 20 hours, sec-butyl benzene and biphenyl are obtained. Hence by mere variation of the conditions another desired end product is obtained.

The ratio of alkylating agent to aromatic hydrocarbon compound can be varied over a wide range. Usually it is preferable to employ an excess over the stoichiometric amount of alkylating agent but in some cases, as when mono alkylation of an aromatic hydrocarbon capable of polyalkylation is desired, it may be preferable to operate with a stoichiometric deficiency of the alkylating agent. Hence the molar ratio may vary (olefin to hydrocarbon) from about .05:1 to 10:1. The preferred range (olefin:hydrocarbon) is from about .5:1 to 5.0:1, although a ratio as high as 50:1 can be used if desired.

The following examples in which all parts and percentages are by weight will serve to further the scope and benefits of this invention.

*Example I*

The potassium graphite inclusion compound ($KC_8$) was prepared by mixing 25 parts of graphite with 18 parts of metallic potassium in a flask. The mixture was stirred well in a nitrogen atmosphere until the mixture became a copper-colored solid. It was noted that this compound was very sensitive to air.

Potassium graphite (4.4 parts) and 22 parts of benzene were added to a reaction vessel which was purged with nitrogen. The mixture was then pressured to 540 p.s.i.g. with ethylene and after one minute the pressure dropped to 340 p.s.i.g. The mixture was then heated to 112° C. and the pressure raised to 740 p.s.i.g. which subsequently dropped down to 450 p.s.i.g. The total reaction time was 3 hours. The reactant mixture was filtered and then distilled to obtain sec-butyl benzene boiling at 170° to 174° C.

*Example II*

The potassium graphite inclusion compound was prepared as set forth in Example I. An autoclave was charged with 34 parts benzene and 3 parts of potassium graphite inclusion compound. The mixture was then pressured to 900 p.s.i.g. at 200° C. for a period of 20 hours. The reaction mixture was filtered and then distilled to obtain a 23 percent yield of sec-butyl benzene and a 19 percent yield of biphenyl.

*Example III*

An autoclave was charged with 24 parts of toluene and 9 parts of potassium graphite inclusion compound. The mixture was then pressured to 800 p.s.i.g. with ethylene at a temperature between 120° C. to 130° C. for a period of 9 hours. The product which was obtained was 3-phenyl pentane in 50 percent yield.

*Example IV*

An autoclave was charged with 24 parts of toluene and 2 parts of potassium graphite inclusion compound and the mixture was pressurized to 970 p.s.i.g. with ethylene. The reaction temperature was from 150° C. to 155° C. for a period of 30 hours. The products were recovered in the same manner as set forth in Example I. The products obtained were n-propyl benzene in a 48 percent yield and 3-phenyl pentane in a 17 percent yield.

*Example V*

Cumene (18 parts) was reacted with ethylene at a pressure of 700 p.s.i.g. in the presence of the potassium graphite inclusion compound (2 parts) at a temperature of 200° C. for a period of 24 hours. The reactant mixture was filtered and then distilled to obtain tertiary amyl benzene in 40 percent yield.

*Example VI*

An autoclave is charged with 14 parts of isobutylene, 13 parts of benzene and 2 parts of cesium graphite inclusion compound ($CsC_8$). The autoclave is heated slowly to 220° C. for a period of 6 hours at 300 p.s.i.g. The reactants are filtered and the resultant mixture is distilled to give teritary butyl benzene.

It will be seen from the above examples that the desired products can be recovered from the reaction mixture by means of distillation procedures. Other separation techniques which can be successfully used include solvent extraction, adsorption procedures and the like. The compounds produced by this alkylation process have many varied uses. For example, the alkylated aromatics are known to have excellent octane qualities and hence these products can be used as gasoline blending stocks. These compounds may also be used as inert solvents for various chemical reactions and as chemical intermediates.

Having thus described the unique processes for the alkylation of aromatic hydrocarbons it is not intended that these processes be limited except as set forth in the claims.

What is claimed is:

1. In a process for alkylating an aromatic hydrocarbon with an acyclic monoolefin containing not more than 12 carbon atoms in the presence of a catalyst, the improvement in which said catalyst consists of the copper-colored potassium graphite inclusion compound $KC_8$ and the reaction is conducted at a temperature of from about 25° C. to about 300° C. and a pressure of from about 1 atmosphere to about 1000 atmospheres sufficient to effect said alkylation.

2. The process of claim 1 wherein said aromatic hydrocarbon is benzene.

3. The process of claim 1 wherein said acyclic monoolefin is ethylene.

4. In a process for alkylating an aromatic hydrocarbon containing a saturated hydrogen-containing carbon atom adjacent to an unsaturated nuclear carbon atom, with an acyclic monoolefin containing not more than 12 carbon atoms in the presence of a catalyst, the improvement in which said catalyst consists of the copper-colored potassium graphite inclusion compound $KC_8$ and the reaction is conducted at a temperature of from about 25° C. to about 300° C. and a pressure of from about 1 atmosphere to about 1000 atmospheres sufficient to effect said alkylation.

5. The process of claim 4 wherein said aromatic hydrocarbon is toluene.

6. The process of claim 4 wherein said aromatic hydrocarbon is cumene.

7. The process of claim 4 wherein said acyclic monoolefin is ethylene.

8. The process of producing secondary butyl benzene which comprises reacting benzene and ethylene in the presence of a catalyst consisting of the copper-colored potassium graphite inclusion compound having the formula, $KC_8$, said process being conducted at a temperature of about 112° C. and at a pressure from about 540 p.s.i.g. to about 740 p.s.i.g.

References Cited by the Examiner

UNITED STATES PATENTS

| 2,186,022 | 1/40 | Holm et al. | 260—671 |
| 2,688,044 | 8/54 | Pines et al. | 269—660 |
| 2,721,886 | 10/55 | Pines et al. | 260—668 |
| 2,965,624 | 12/60 | Anderson | 260—94.2 |
| 2,995,610 | 8/61 | Schaap | 260—668 |
| 3,084,206 | 4/63 | Yeo et al. | 260—683.15 |

OTHER REFERENCES

Chemical Abstracts, 45, 6110b (1951).

Chemical Abstracts, 50, 656b (1956).

Moeller: "Inorganic Chemistry," John Wiley and Sons, Inc., New York, 1952, pp. 664 to 668.

Asher: Journal of Inorganic and Nuclear Chemistry, vol. 10, pp. 238–249 (1959).

ALPHONSO D. SULLIVAN, *Primary Examiner.*